G. Barton, Jr.,
Door Spring.
N° 1,668.    Patented July 1, 1840.
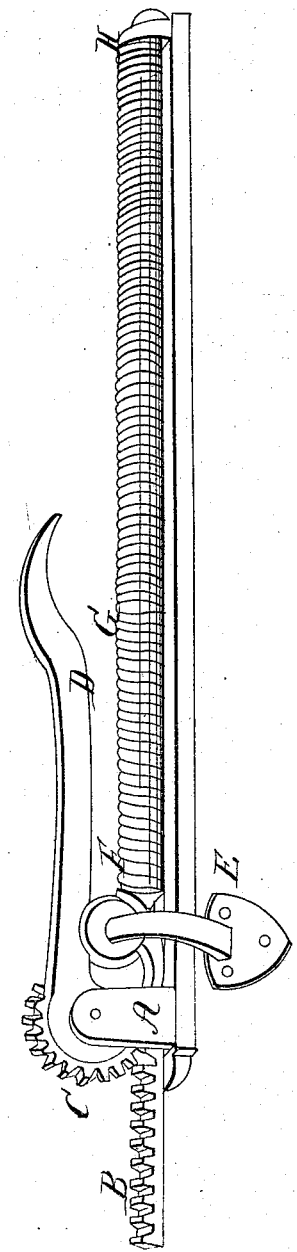

UNITED STATES PATENT OFFICE.

GARDNER BARTON, JR., OF SHAFTSBURY, VERMONT.

DOOR-SPRING FOR CLOSING DOORS, GATES, &c.

Specification of Letters Patent No. 1,668, dated July 1, 1840.

*To all whom it may concern:*

Be it known that I, GARDNER BARTON, Jr., of Shaftsbury, in the county of Bennington and State of Vermont, have invented a new and Improved Mode of Closing Doors and Gates, called the "Rack-Spring;" and I do hereby declare that the following is a full and exact description.

The nature of my invention consists in providing an open spiral spring which acts as a rack and gives motion to a segment of a wheel and lever fixed in a standard and made fast to the casement above door, or gate, in such a manner that the lever may bear on a friction roller, placed on a stud which is attached to the door, or gate.

To enable others skilled in the art to make and use my invention, I will proceed to describe its construction and operation.

I make a base or standard marked A, on the drawings consisting of a plate of cast iron, brass, or other metal, about one foot, six inches long, one inch wide and one fourth of an inch thick. On one end of this plate are two standards, or ears, rising about two inches above the face of the plate, these standards, or ears support the segment of the wheel C, and lever D. One end of the rack B is inserted between the ears near the base. On the other end of the plate, is a standard marked H, made transversely, or crosswise of the plate, and perforated with a hole in which the other end of the rack is placed.

The rack B, is made of cast iron, brass, or other metal, and is about one foot and ten inches long. One end is nearly square and indented with teeth for about the length of four inches; the other end is round, and about one half of an inch in diameter; a small ring or collar is made around it, near the teeth of the rack.

The spiral spring, G, is made of iron, or steel wire—this spring is formed by winding the wire around an arbor, in the form of the thread of a screw, and open so that the threads do not come in contact with each other, the round end of the rack should be introduced in to the spring in the place of the arbor on which it was wound, in such a manner that one end of the spring will bear against the collar of the rack and the other end will push against the standard H.

The segment of a wheel C, and the lever D, is made in one piece of any sufficient metal, the segment being a little larger than a semicircle, and is supplied with teeth to correspond with the teeth of the rack B, the radius of the segment being about one and one fourth of an inch long, the thickness is about three eighths of an inch, the part D, called the lever is about nine inches long, and near the end it curves backward; this lever and segment is secured in its place between the ears of the standards A by a pin on which the segment turns, and the lever bears, or acts on the friction roller F.

The stud E, may be made of any strong metal, and it should be fastened to the door, or gate near the top of the same, and it may be secured with wood screws to the door, or gate about five inches forward of the hinges, on the top end of this stud is fixed the friction roller F, this friction roller is about one inch in diameter, having a groove on the outside to receive the edge of the lever D.

I would here suggest that a friction roller may be made to turn on an arbor extending downward and passing into a hole in the top of the stud E, in such a manner that it can be easily removed, and in that case the spring will ease to act on the door or gate and this in some cases will be a convenience, particularly on doors during the warm season.

The mode of application is to secure the plate A to the casement above the door or gate this may be done with wood screws, and it should be so placed that the center of the two standards or ears will be about three inches and three fourths of an inch forward of a perpendicular line drawn through the center of the butts, or hinges on which the door or gate turns by forward I here mean nearer to that side of the door or gate on which is the latch. The spring should be put on to the round end of the rack, and the rack introduced in to its place between the standards or ears and it will be perceived that the rack and spring are directly in front, or over the heads of the wood screws that serve to secure the plate A to the casement beforementioned.

The segment of the wheel C, and lever D, should be put in its place between the standards, or ears in such a manner that the teeth of the segment, and the teeth of the rack will properly agree, or correspond to each other, and the segment should be secured in its place by the pin on which the segment turns this pin is the fulcrum of the lever D.

The stud E, with the friction roller F, attached, may be secured to the door or gate with wood screws and the center of the stud should be about five inches forward of the perpendicular line drawn through the center of the butts or hinges before named thus when the door, or gate is closed the friction roller F, will be borne or acted on by that part of the lever D which is nearest to the fulcrum of the lever. Now as some doors and gates can not be opened as far as others by reason of some angular wall, partition, or other obstruction and as it is desirable to have the friction roller F, approach or roll out near to the end of the lever D, when the door, or gate is opened as far as the case admits, then, and in such case, it will be proper to screw, or fasten the plate A, with its appendages, and the stud E,—with its friction roller F, some farther forward of the perpendicular line drawn through the center of the butts, or hinges than was before mentioned. The artisan will readily discover the proper location according as the condition of the circumstances require.

By the foregoing arrangement it will be perceived that the door or gate is acted on with the greatest power when the same requires to be latched.

What I claim as my invention and desire to secure by Letters Patent is—

The combination and arrangement of the spring, rack, segment and lever—and the roller F, attached, or working on the standard E, in the manner and for the purpose described.

GARDNER BARTON, Jr.

Witnesses:
JOHN HASTINGS,
N. B. NEWCOMB.